United States Patent
Sundaram et al.

(10) Patent No.: US 10,042,853 B2
(45) Date of Patent: Aug. 7, 2018

(54) FLASH OPTIMIZED, LOG-STRUCTURED LAYER OF A FILE SYSTEM

(71) Applicant: NetApp, Inc., Sunnyvale, CA (US)

(72) Inventors: Rajesh Sundaram, Mountain View, CA (US); Stephen Daniel, Durham, NC (US); Jeffrey S. Kimmel, Chapel Hill, NC (US); Blake H. Lewis, Los Altos Hills, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 15/239,125

(22) Filed: Aug. 17, 2016

(65) Prior Publication Data

US 2016/0357776 A1 Dec. 8, 2016

Related U.S. Application Data

(63) Continuation of application No. 14/150,717, filed on Jan. 8, 2014, now Pat. No. 9,448,924.

(51) Int. Cl.
*G06F 12/00* (2006.01)
*G06F 17/30* (2006.01)
(Continued)

(52) U.S. Cl.
CPC ...... *G06F 17/30138* (2013.01); *G06F 3/0604* (2013.01); *G06F 3/064* (2013.01);
(Continued)

(58) Field of Classification Search
CPC .. G06F 12/0246; G06F 3/0604; G06F 3/0647; G06F 3/0688; G06F 2003/0697; G06F 2212/7208
(Continued)

(56) References Cited

U.S. PATENT DOCUMENTS 5,511,190 A 4/1996 Sharma et al.
5,937,425 A 8/1999 Ban
(Continued)

OTHER PUBLICATIONS

Cornwall, Michael, "Anatomy of a Solid-state Drive," ACM Queue-Networks, vol. 10, No. 10, Oct. 2012, pp. 1-7.
(Continued)

*Primary Examiner* — Matthew Bradley
(74) *Attorney, Agent, or Firm* — Cesari & McKenna, LLP

(57) ABSTRACT

A flash-optimized, log-structured layer of a file system of a storage input/output (I/O) stack executes on one or more nodes of a cluster. The log-structured layer of the file system provides sequential storage of data and metadata (i.e., a log-structured layout) on solid state drives (SSDs) of storage arrays in the cluster to reduce write amplification, while leveraging variable compression and variable length data features of the storage I/O stack. The data may be organized as an arbitrary number of variable-length extents of one or more host-visible logical units (LUNs) served by the nodes. The metadata may include mappings from host-visible logical block address ranges (i.e., offset ranges) of a LUN to extent keys, as well as mappings of the extent keys to SSD storage locations of the extents. The storage location of an extent on SSD is effectively "virtualized" by its mapped extent key (i.e., extent store layer mappings) such that relocation of the extent on SSD does require update to volume layer metadata (i.e., the extent key sufficiently identifies the extent).

20 Claims, 8 Drawing Sheets

(51) Int. Cl.
*G06F 3/06* (2006.01)
*G06F 12/02* (2006.01)

(52) U.S. Cl.
CPC .......... *G06F 3/0608* (2013.01); *G06F 3/0616* (2013.01); *G06F 3/0643* (2013.01); *G06F 3/0644* (2013.01); *G06F 3/0647* (2013.01); *G06F 3/0659* (2013.01); *G06F 3/0679* (2013.01); *G06F 3/0685* (2013.01); *G06F 3/0688* (2013.01); *G06F 12/0246* (2013.01); *G06F 17/30185* (2013.01); *G06F 17/30218* (2013.01); *G06F 2003/0697* (2013.01); *G06F 2212/2022* (2013.01); *G06F 2212/7208* (2013.01)

(58) Field of Classification Search
USPC .................................................. 711/103, 114
See application file for complete search history.

(56) References Cited

U.S. PATENT DOCUMENTS

| | | | |
|---|---|---|---|
| 7,249,150 | B1 | 7/2007 | Watanabe et al. |
| 7,325,059 | B2 | 1/2008 | Barach et al. |
| 7,464,125 | B1 | 12/2008 | Orzag et al. |
| 7,562,101 | B1 | 7/2009 | Jernigan et al. |
| 7,562,203 | B2 | 7/2009 | Scott et al. |
| 7,644,087 | B2 | 1/2010 | Barkai et al. |
| 7,680,837 | B2 * | 3/2010 | Yamato ............... G06F 12/0246 707/672 |
| 7,743,035 | B2 | 6/2010 | Chen et al. |
| 7,873,619 | B1 | 1/2011 | Faibish et al. |
| 7,949,693 | B1 | 5/2011 | Mason et al. |
| 7,996,636 | B1 | 8/2011 | Prakash et al. |
| 8,082,390 | B1 | 12/2011 | Fan et al. |
| 8,099,396 | B1 | 1/2012 | Novick et al. |
| 8,140,821 | B1 | 3/2012 | Raizen et al. |
| 8,205,065 | B2 | 6/2012 | Matze |
| 8,261,085 | B1 | 9/2012 | Gutierrez |
| 8,341,457 | B2 | 12/2012 | Spry et al. |
| 8,417,987 | B1 | 4/2013 | Goel et al. |
| 8,452,929 | B2 | 5/2013 | Bennett |
| 8,463,825 | B1 | 6/2013 | Harty et al. |
| 8,495,417 | B2 | 7/2013 | Jernigan, IV et al. |
| 8,539,008 | B2 | 9/2013 | Faith et al. |
| 8,560,879 | B1 | 10/2013 | Goel |
| 8,595,595 | B1 | 11/2013 | Grcanac et al. |
| 8,600,949 | B2 | 12/2013 | Periyagaram et al. |
| 8,645,664 | B1 | 2/2014 | Colgrove et al. |
| 8,751,763 | B1 | 6/2014 | Ramarao |
| 8,806,160 | B2 | 8/2014 | Colgrove et al. |
| 8,949,568 | B2 | 2/2015 | Wei |
| 2002/0073068 | A1 | 6/2002 | Guha |
| 2003/0120869 | A1 | 6/2003 | Lee et al. |
| 2003/0159007 | A1 | 8/2003 | Sawdon et al. |
| 2004/0052254 | A1 | 3/2004 | Hooper |
| 2005/0144514 | A1 | 6/2005 | Ulrich et al. |
| 2007/0061572 | A1 | 3/2007 | Imai et al. |
| 2007/0143359 | A1 | 6/2007 | Uppala |
| 2008/0126695 | A1 | 5/2008 | Berg |
| 2008/0250270 | A1 | 10/2008 | Bennett |
| 2009/0271412 | A1 | 10/2009 | Lacapra et al. |
| 2009/0313503 | A1 | 12/2009 | Atluri et al. |
| 2010/0042790 | A1 | 2/2010 | Mondal et al. |
| 2010/0088296 | A1 | 4/2010 | Periyagaram et al. |
| 2011/0035548 | A1 | 2/2011 | Kimmel et al. |
| 2011/0060876 | A1 | 3/2011 | Liu |
| 2011/0099342 | A1 | 4/2011 | Ozdemir |
| 2011/0191389 | A1 | 8/2011 | Okamoto |
| 2011/0213928 | A1 | 9/2011 | Grube et al. |
| 2011/0314346 | A1 | 12/2011 | Vas et al. |
| 2012/0011176 | A1 | 1/2012 | Alzman |
| 2012/0143877 | A1 | 6/2012 | Kumar et al. |
| 2012/0246129 | A1 | 9/2012 | Rothschild et al. |
| 2012/0278382 | A1 | 11/2012 | Faith et al. |
| 2012/0290788 | A1 * | 11/2012 | Klemm ............... G06F 3/0608 711/114 |
| 2013/0018854 | A1 | 1/2013 | Condict |
| 2013/0086006 | A1 | 4/2013 | Colgrove et al. |
| 2013/0138862 | A1 | 5/2013 | Motwani et al. |
| 2013/0227201 | A1 | 8/2013 | Talagala et al. |
| 2013/0238832 | A1 | 9/2013 | Dronamraju et al. |
| 2013/0238932 | A1 | 9/2013 | Resch |
| 2013/0262805 | A1 | 10/2013 | Zheng et al. |
| 2013/0268497 | A1 | 10/2013 | Baldwin et al. |
| 2013/0275656 | A1 | 10/2013 | Talagala et al. |
| 2013/0346700 | A1 | 12/2013 | Tomlinson et al. |
| 2013/0346720 | A1 | 12/2013 | Colgrove et al. |
| 2013/0346810 | A1 | 12/2013 | Kimmel et al. |

OTHER PUBLICATIONS

"Cuckoo hashing," Wikipedia, http://en.wikipedia.org/wiki/Cuckoo_hash, Apr. 2013, pp. 1-5.
Culik, K., et al., "Dense Multiway Trees," ACM Transactions on Database Systems, vol. 6, Issue 3, Sep. 1981, pp. 486-512.
Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.
Gal, Eran et al., "Algorithms and Data Structures for Flash Memories," ACM Computing Surveys, vol. 37, No. 2, Jun. 2005, pp. 138-163.
Gray, Jim et al., "Flash Disk Opportunity for Server Applications," Queue—Enterprise Flash Storage, vol. 6, Issue 4, Jul.-Aug. 2008, pp. 18-23.
Handy, Jim, "SSSI Tech Notes: How Controllers Maximize SSD Life," SNIA, Jan. 2013, pp. 1-20.
Kagel, Art S., "two-way merge sort", Dictionary of Algorithms and Data Structures [online], May 2005 [retrieved on Jan. 28, 2015]. Retrieved from the Internet:< URL: http://xlinux.nist.gov/dads/HTML/twowaymrgsrt.html> (1 page).
Leventhal, Adam H., "A File System All Its Own," Communications of the ACM Queue, vol. 56, No. 5, May 2013, pp. 64-67.
Lim, H. et al., "SILT: A Memory-Efficient, High-Performance Key-Value Store," Proceedings of the 23rd ACM Symposium on Operating Systems Principles (SOSP'11), Oct. 23-26, 2011, pp. 1-13.
Moshayedi, Mark, et al., "Enterprise SSDs," ACM Queue—Enterprise Flash Storage, vol. 6 No. 4, Jul.-Aug. 2008, pp. 32-39.
O'Neil, Patrick, et al. "The log-structured merge-tree (LSM-tree)". Acta Informatica 33. pp. 351-385. 1996.
Pagh, Rasmus, et al., "Cuckoo Hashing," Elsevier Science, Dec. 8, 2003, pp. 1-27.
Pagh, Rasmus, "Cuckoo Hashing for Undergraduates," IT University of Copenhagen, Mar. 27, 2006, pp. 1-6.
PCT Notification of Transmittal of the International Search Report and the Written Opinion of the International Searching Authority, or the Declaration, International Searching Authority, International Application No. PCT/US2014/071484, dated Mar. 25, 2015, 9 pages.
Rosenblum, Mendel, et al., "The Design and Implementation of a Log-Structured File System," Proceedings of the 13th ACM Symposium on Operating Systems Principles, Jul. 24, 1991, pp. 1-15.
Rosenblum, Mendel, et al., "The LFS Storage Manager," Summer '90 USENIX Technical Conference, Anaheim, California, Jun. 1990, pp. 1-16.
Rosenblum, Mendel, "The Design and Implementation of a Log-structured File System," UC Berkeley, Thesis, 1992, pp. 1-101.
Seltzer, Margo, et al., "An Implementation of a Log Structured File System for UNIX," Winter USENIX, San Diego, CA, Jan. 25-29, 1993, pp. 1-18.
Seltzer, Margo, et al., "File System Performance and Transaction Support," UC Berkeley, Thesis, 1992, pp. 1-131.
Smith, Kent, "Garbage Collection," SandForce, Flash Memory Summit, Santa Clara, CA, Aug. 2011, pp. 1-9.
Twigg, Andy, et al., "Stratified B-trees and Versioned Dictionaries," Proceedings of the 3rd USENIX Conference on Hot Topics in Storage and File Systems, vol. 11, 2011, pp. 1-5.

(56) References Cited

OTHER PUBLICATIONS

Wu, Po-Liang, et al., "A File-System-Aware FTL Design for Flash-Memory Storage Systems," Design, Automation & Test in Europe Conference & Exhibition, IEEE, 2009, pp. 1-6.

* cited by examiner

FLASH OPTIMIZED, LOG-STRUCTURED LAYER OF A FILE SYSTEM

CROSS-REFERENCE TO RELATED APPLICATIONS

The present application is a continuation of U.S. patent application Ser. No. 14/150,717, entitled Flash Optimized, Log-Structured Layer of a File System, filed on Jan. 8, 2014 by Rajesh Sundaram, et al., and is related to U.S. patent application Ser. No. 14/160,991, filed on Jan. 22, 2014, entitled Flash Optimized, Log-Structured Layer of a File System, by Rajesh Sundaram, et al., now issued as U.S. Pat. No. 8,880,788 on Nov. 4, 2014, which applications are hereby incorporated by reference.

BACKGROUND

Technical Field

The present disclosure relates to storage systems and, more specifically, to a flash optimized, log-structured layer of a file system of one or more storage systems of a cluster.

Background Information

A storage system typically includes one or more storage devices, such as solid state drives (SSDs) embodied as flash storage devices, into which information may be entered, and from which the information may be obtained, as desired. The storage system may implement a high-level module, such as a file system, to logically organize the information stored on the devices as storage containers, such as files or logical units (LUNs). Each storage container may be implemented as a set of data structures, such as data blocks that store data for the storage containers and metadata blocks that describe the data of the storage containers. For example, the metadata may describe, e.g., identify, storage locations on the devices for the data. In addition, the metadata may contain copies of a reference to a storage location for the data (i.e., many-to-one), thereby requiring updates to each copy of the reference when the location of the data changes, e.g., a "cleaning" process. This contributes significantly to write amplification as well as to system complexity (i.e., tracking the references to be updated).

Some types of SSDs, especially those with NAND flash components, may or may not include an internal controller (i.e., inaccessible to a user of the SSD) that moves valid data from old locations to new locations among those components at the granularity of a page (e.g., 8 Kbytes) and then only to previously-erased pages. Thereafter, the old locations where the pages were stored are freed, i.e., the pages are marked for deletion (or as invalid). Typically, the pages are erased exclusively in blocks of 32 or more pages (i.e., 256 KB or more). This process is generally referred to as garbage collection and results in substantial write amplification in the system.

In addition, the "on-disk" layout of the data structures in the storage containers (i.e., on the SSDs) may create a plurality of odd-shaped random "hole" (i.e., deleted data) fragments adjacent to data. This fragmented data (i.e., data with interposed holes) may not facilitate natural alignment boundaries for Redundant Array of Independent Disk (RAID) configurations, thus raising problematic RAID implications. For example, if an attempt is made to write data into the odd-shaped fragments, it may be difficult to achieve good RAID stripe efficiency because partial stripes may be written, causing increased write amplification due to increased parity overhead.

Yet another source of write amplification in the system may involve RAID-related operations. Assume a dual parity RAID implementation that may include a plurality of data SSDs and two parity SSDs. A random write operation that stores write data on a data SSD of a RAID stripe may result in a plurality of read-modify-write (RMW) operations that, e.g., updates the data SSD with write data and updates the two parity SSDs with parity information after reading a portion of the write data and/or parity information. Such RAID-related operations results in a substantial amount of write amplification to the system.

Therefore, it is desirable to provide a file system that reduces various sources of write amplification from a storage system, wherein the sources of write amplification include, inter alia, 1) storage location reference updates; 2) internal SSD garbage collection; 3) partial RAID stripe operations from fragmented data; and 4) RMW operations from RAID organizations of data and parity.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

Figure 1:
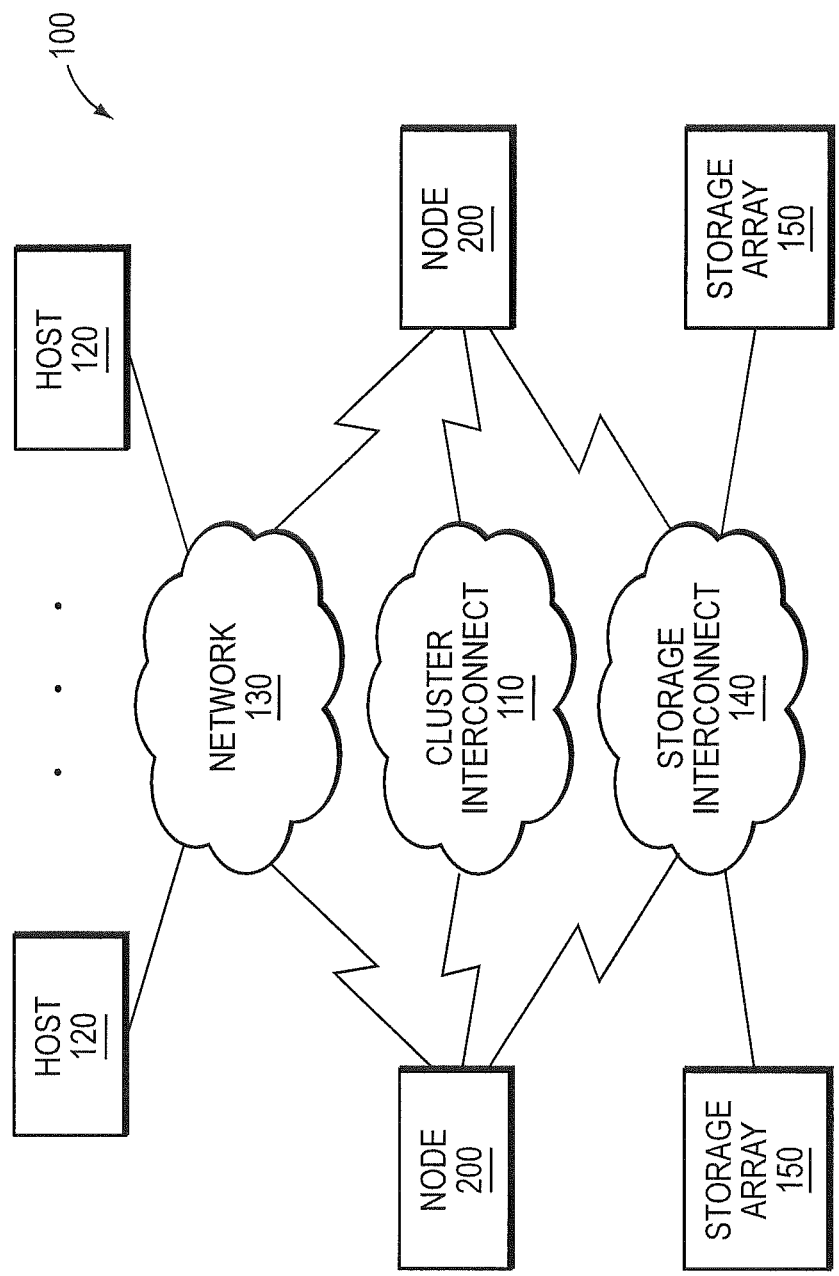
FIG. 1 is a block diagram of a plurality of nodes interconnected as a cluster.

The embodiments described herein are directed to a flash-optimized, log-structured layer of a file system of a storage input/output (I/O) stack executing on one or more nodes of a cluster. As described herein, the log-structured layer provides sequential storage of data and metadata (i.e., a log-structured layout) on solid state drives (SSDs) of storage arrays in the cluster to reduce write amplification, while leveraging variable compression and variable length data features of the storage I/O stack. The data may be organized as an arbitrary number of variable-length extents of one or more host-visible logical units (LUNs) served by the nodes. The metadata may include mappings from host-visible logical block address ranges (i.e., offset ranges) of a LUN to extent keys, as well as mappings of the extent keys to SSD storage locations of the extents.

In an embodiment, an extent store layer of the file system performs and maintains the mappings of the extent keys to SSD storage locations, while a volume layer of the file system performs and maintains the mappings of the LUN offset ranges to the extent keys. Illustratively, the volume layer cooperates with the extent store layer to provide a level of indirection that facilitates efficient log-structured layout of extents by the extent store layer. That is, the extent key mappings maintained by the volume layer allow relocation of the extents on SSD during, e.g., segment cleaning, without update to the volume layer mappings. Accordingly, the storage location of an extent on SSD is effectively "virtualized" by its mapped extent key (i.e., extent store layer mappings) such that relocation of the extent on SSD does not require update to volume layer metadata (i.e., the extent key sufficiently identifies the extent). The virtualization of storage locations permits cleaning processes to occur in the extent store layer without update to volume layer metadata, thereby substantially reducing write amplification.

In an embodiment, functions of the log-structured layer of the file system, such as write allocation and flash device (i.e., SSD) management, are performed and maintained by the extent store layer. Flash device management may include segment cleaning to illustratively clean one or more selected regions or segments that indirectly map to SSDs. To clean a selected segment, the extent store layer may move extents of the segment that contain valid data to one or more different segments so as to free the selected segment. Once the segment is designated freed, additional extents may be written as a sequence of write operations to the segment in accordance with the log-structured layout so as to optimize storage performance of the flash storage devices (e.g., to reduce garbage collection within the SSD). Illustratively, the log-structured layer of the file system may write the extents as a sequence of contiguous range write operations to the entire segment with temporal locality so as to reduce data relocation (i.e., internal flash block management) that may occur within the SSDs as a result of the write operations. It should be noted that the sequence of write operations need not be in a specific order (e.g., in ascending range), but that the operations be of contiguous ranges and written with temporal locality.

Write allocation may include gathering of the variable-length extents to form one or more stripes across SSDs of one or more RAID groups. In an embodiment, the RAID layer may manage parity computations and topology information used for placement of the extents on the SSDs of each RAID group. To that end, the RAID layer may cooperate with the extent store layer to organize the extents as stripes within the RAID groups. Illustratively, the extent store layer may gather the extents to form one or more full stripes that may be written to a free segment such that a single stripe write operation may span all SSDs in a RAID group. The extent store layer may also cooperate with the RAID layer to pack each stripe as a full stripe of variable-length extents. Once the stripe is complete, the RAID layer may pass the full stripe of extents to a storage layer of the storage I/O stack for storage on the SSDs. By writing a full stripe (i.e., data and parity) to the free segment, the log-structured layer of the file system avoids the cost of parity updates (i.e., read-modify-write of existing data in a stripe) and spreads the read operation load across the SSDs.

Advantageously, the volume and extent store layer file systems may cooperate to store the extents on SSD in a log-structured manner that is flash friendly with respect to random write operations and that reduces write amplification (e.g., particularly RAID-related write amplification).

Description

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
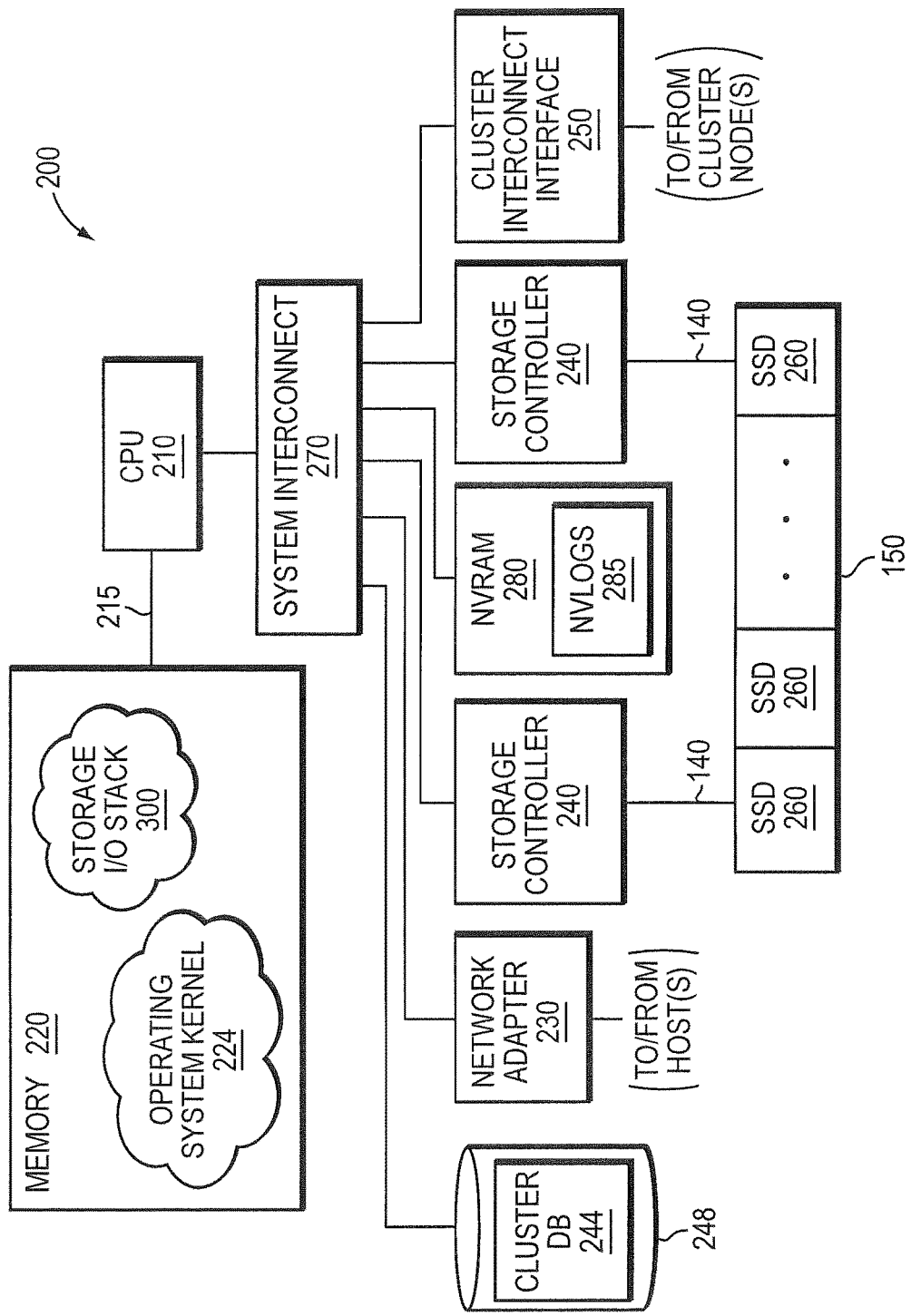
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250, and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements may be used, such as a conventional serial ATA (SATA) topology or a PCI topology. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as InfiniBand, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
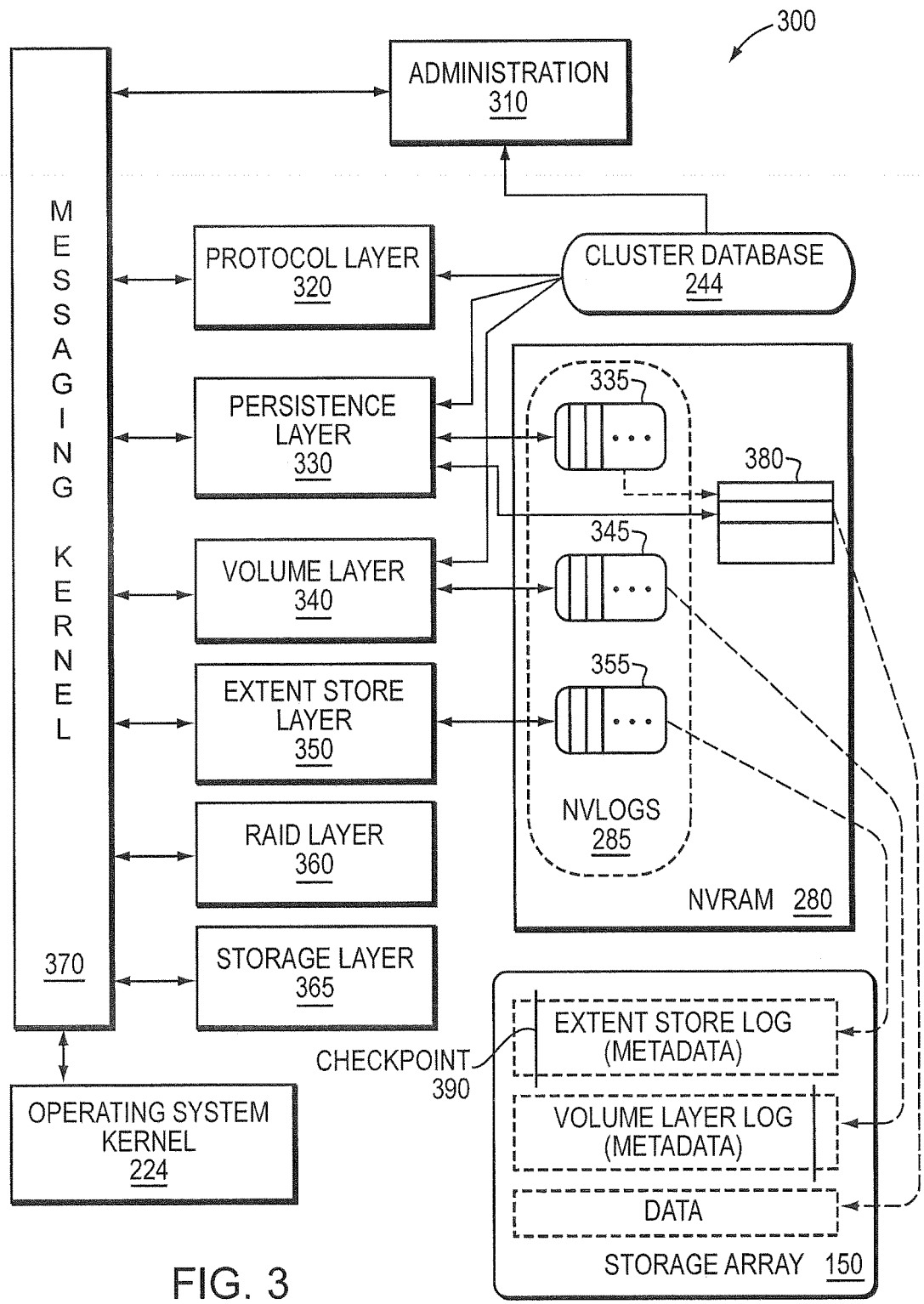
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a RAID layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380 illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 355 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset and length, hereinafter offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoints with incremental changes recorded in the one or more log files) in which selected in-core mappings (less than the total) are committed to the array 150 at various intervals (e.g., driven by an amount of change to the in-core mappings, size thresholds of log 355, or periodically). Notably, the accumulated entries in log 355 may be retired once all in-core mappings have been committed to include changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
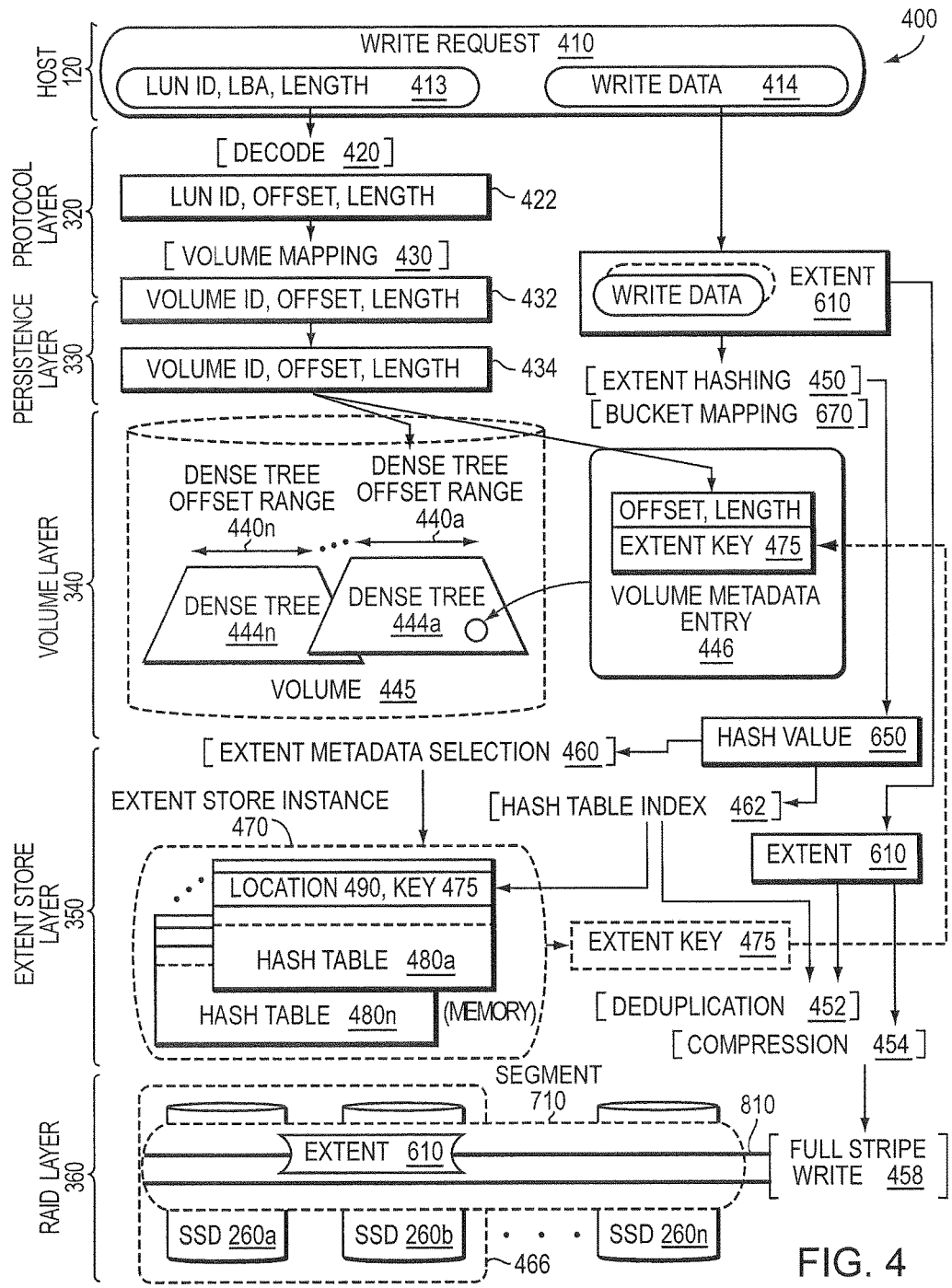
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. The persistence layer 330 may aggregate and organize write data 414 from one or more write requests into a new extent 610 and perform a hash computation, i.e., a hash function, on the new extent to generate a hash value 650 in accordance with an extent hashing technique 450.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 670 is provided that translates the hash value 650 to an instance 470 of an appropriate extent store layer (i.e., extent store instance 470) that is responsible for storing the new extent 610. The bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 670 described herein. The persistence layer 330 may then pass the hash value 650 and the new extent 610 to the appropriate volume layer instance and onto the appropriate extent store instance via an extent store put operation. The extent hashing technique 450 may embody an approximately uniform hash function to ensure that any random extent to be written may have an approximately equal chance of falling into any extent store instance 470, i.e., hash buckets are distributed across extent store instances of the cluster 100 based on available resources. As a result, the bucket mapping technique 670 provides load-balancing of write operations (and, by symmetry, read operations) across nodes 200 of the cluster, while also leveling flash wear in the SSDs 260 of the cluster.

In response to the put operation, the extent store instance may process the hash value 650 to perform an extent metadata selection technique 460 that (i) selects an appropriate hash table 480 (e.g., hash table 480a) from a set of hash tables (illustratively in-core) within the extent store instance 470, and (ii) extracts a hash table index 462 from the hash value 650 to index into the selected hash table and lookup a table entry having an extent key 475 identifying a storage location 490 on SSD 260 for the extent. Accordingly, the extent store layer 350 contains computer executable instructions executed by the CPU 210 to perform operations that implement the metadata selection technique 460 described herein. If a table entry with a matching key is found, then SSD location 490 mapped from the extent key 475 is used to retrieve an existing extent (not shown) from SSD. The existing extent is then compared with the new extent 610 to determine whether their data is identical. If the data is identical, the new extent 610 is already stored on SSD 260 and a de-duplication opportunity (denoted de-duplication 452) exists such that there is no need to write another copy of the data. Accordingly, a reference count in the table entry for the existing extent is incremented and the extent key 475 of the existing extent is passed to the appropriate volume layer instance for storage within an entry (denoted as volume metadata entry 446) of a dense tree metadata structure 444 (e.g., dense tree 444a), such that the extent key 475 is associated an offset range 440 (e.g., offset range 440a) of the volume 445.

However, if the data of the existing extent is not identical to the data of the new extent 610, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g., hash table 480n) of extent store instance 470 may be selected by a new candidate extent key in accordance with the extent metadata selection technique 460. In the event that no de-duplication opportunity exists (i.e., the extent is not already stored) the new extent 610 is compressed in accordance with compression technique 454 and passed to the RAID layer 360, which processes the new extent 610 for storage on SSD 260 as a stripe 810 of RAID group 466. The extent store instance may cooperate with the RAID layer 360 to identify a storage segment 710 (i.e., a portion of the storage array 150) and a location on SSD 260 within the segment 710 in which to store the new extent 610. Illustratively, the identified storage segment is a segment with a large contiguous free space having, e.g., location 490 on SSD 260b for storing the extent 610.

In an embodiment, the RAID layer 360 then writes the stripe 810 across the RAID group 466, illustratively as a full stripe write 458. The RAID layer 360 may write a series of stripes 810 of sufficient depth to reduce data relocation that may occur within flash-based SSDs 260 (i.e., flash block management). The extent store instance then (i) loads the SSD location 490 of the new extent 610 into the selected hash table 480n (i.e., as selected by the new candidate extent key), (ii) passes a new extent key (denoted as extent key 475) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer 345. Accordingly, the I/O (write) request is sufficiently stored on SSD 260 of the cluster.

Read Path

Figure 5:
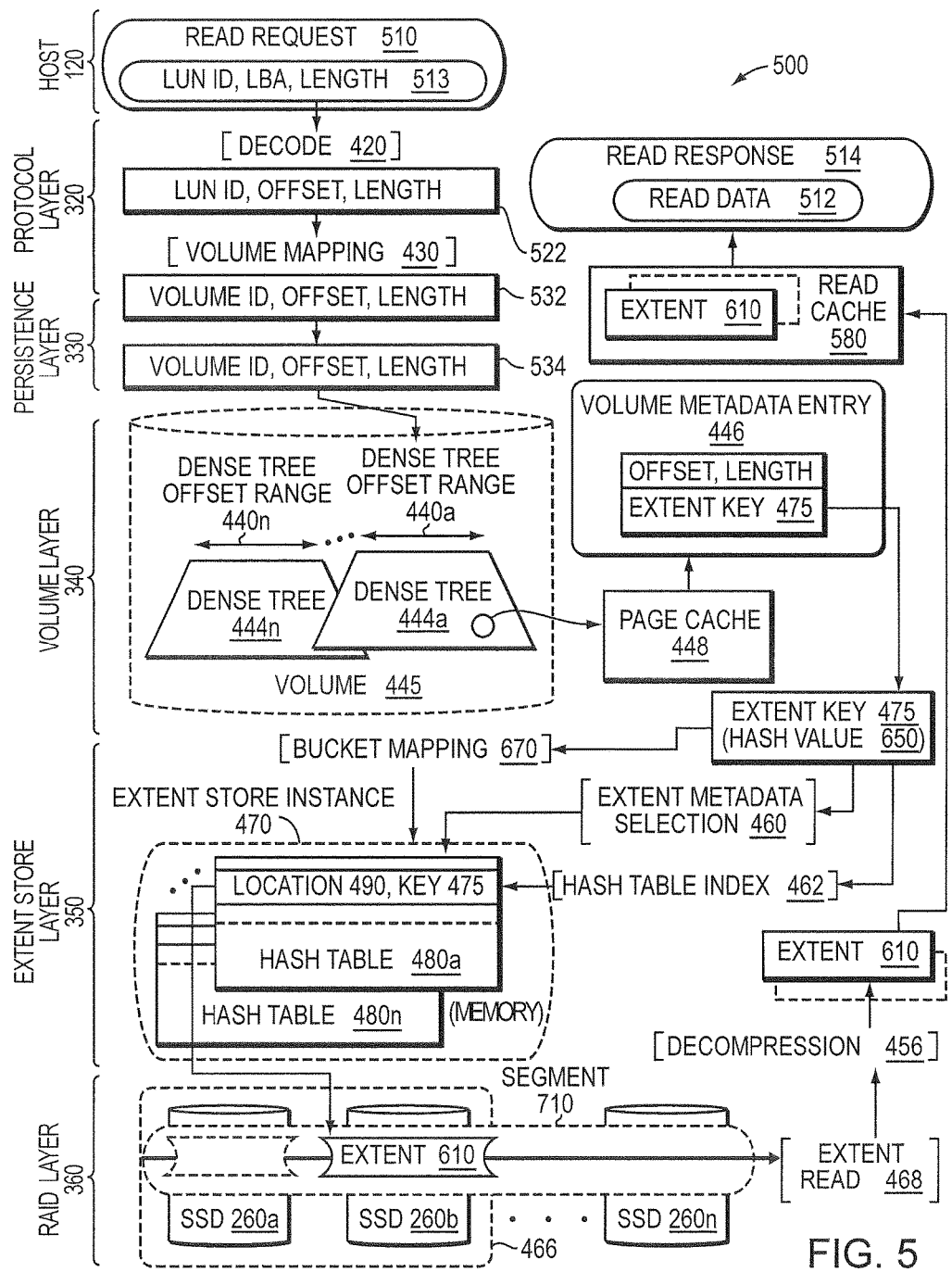
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write-back cache 380 to determine whether some or all of the read request can be serviced from its cached data. If the entire request cannot be serviced from the cached data, the persistence layer 330 may then pass the read request including, e.g., the volume ID, offset and length, as parameters 534 to the appropriate volume layer instance in accordance with the function shipping mechanism, e.g., RPC, for inter-node communication or the IPC mechanism, e.g., message threads, for intra-node communication.

The volume layer instance may process the read request to access a dense tree metadata structure 444 (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 475 associated with one or more extents 610 (or portions of extents) within the requested offset range. In an embodiment, each dense tree 444 may be embodied as multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched (e.g., a binary search) to find any overlapping entries. This process is then iterated until one or more volume metadata entries 446 of a level are found to ensure that the extent key(s) 475 for the entire requested read range are found. If no metadata entries exist for the entire or portions of the requested read range, then the missing portion(s) are zero filled.

Once found, each extent key 475 is processed by the volume layer 340 to, e.g., implement the bucket mapping technique 670 that translates the extent key to an appropriate extent store instance 470 responsible for storing the requested extent 610. Note that, in an embodiment, each extent key 475 may be substantially identical to the hash value 650 associated with the extent 610, i.e., the hash value as calculated during the write request for the extent, such that the bucket mapping 670 and extent metadata selection 460 techniques may be used for both write and read path operations. Note also that the extent key 475 may be derived from the hash value 650. The volume layer 340 may then pass the extent key 475 (i.e., the hash value from a previous write request for the extent) to the appropriate extent store instance 470 (via an extent store get operation), which performs an extent key-to-SSD mapping to determine the location on SSD 260 for the extent.

In response to the get operation, the extent store instance may process the extent key 475 (i.e., hash value 650) to perform the extent metadata selection technique 460 that (i) selects an appropriate hash table 480 (e.g., hash table 480a) from a set of hash tables within the extent store instance 470, and (ii) extracts a hash table index 462 from the extent key 475 (i.e., hash value 650) to index into the selected hash table and lookup a table entry having a matching extent key 475 that identifies a storage location 490 on SSD 260 for the extent 610. That is, the SSD location 490 mapped to the extent key 475 may be used to retrieve the existing extent (denoted as extent 610) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 610 to the extent store instance. The extent store instance may then decompress the extent 610 in accordance with a decompression technique 456, although it will be understood to those skilled in the art that decompression can be performed at any layer of the storage I/O stack 300. The extent 610 may be stored in a buffer (not shown) in memory 220 and a reference to that buffer may be passed back through the layers of the storage I/O stack 300. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Log-Structured Layer of File System

The embodiments described herein are directed to a flash-optimized, log-structured layer of a file system of the storage I/O stack. The log-structured layer (i.e., extent store layer) of the file system provides sequential storage of data and metadata (i.e., log-structured layout) on the SSDs 260 of the cluster to reduce write amplification, while leveraging the variable compression and variable length extent features, as well as the extent de-duplication feature, of the storage I/O stack 300. The data may be organized as an arbitrary number of variable-length extents of one or more host-visible LUNs served by the nodes and stored as extents. The metadata may include mappings from host-visible logical block address ranges (i.e., offset ranges) of a LUN to extent keys (e.g., volume layer metadata), as well as mappings of the extent keys to SSD storage locations of the extents (e.g., extent store layer metadata). Illustratively, the volume layer cooperates with the extent store layer to provide a level of indirection that facilitates efficient log-structured layout of extents on the SSDs by the extent store layer. That is, the extent key mappings maintained by the volume layer allow relocation of the extents on SSD during, e.g., segment cleaning, without update to the volume layer mappings. Accordingly, the storage location of an extent on SSD is effectively "virtualized" by its mapped extent key (i.e., extent store layer mappings) such that relocation of the extent on SSD does not require update to volume layer metadata (i.e., the extent key sufficiently identifies the extent). The virtualization of the storage locations also permits cleaning processes to occur in the extent store layer without update to volume layer metadata, thereby substantially reducing write amplification.

In an embodiment, the mappings of the extent keys to SSD storage locations are performed and maintained by the extent store layer, while the mappings of the LUN offset ranges to the extent keys are performed and maintained by the volume layer. Separation of these mapping functions between the volume and extent store layers enables different volumes with different offset ranges to reference (map to) a same extent key (and thus a same extent). Notably, separation of the volume layer and extent store layer of the layered file system enables efficient performance of inline de-duplication that illustratively ensures that there is only one copy of each extent stored on the storage arrays of the cluster. Such assurance is global to the cluster as the single copy of the stored extent may span volumes and nodes of the cluster. Notably, de-duplication may be selectively applied only to data and not metadata (e.g., volume and extent store layer mappings), so as to reduce latency of metadata operations, e.g., writes of metadata. In an embodiment, selective de-duplication may be accomplished by passing a flag in a write operation to the extent store layer.

Figure 6:
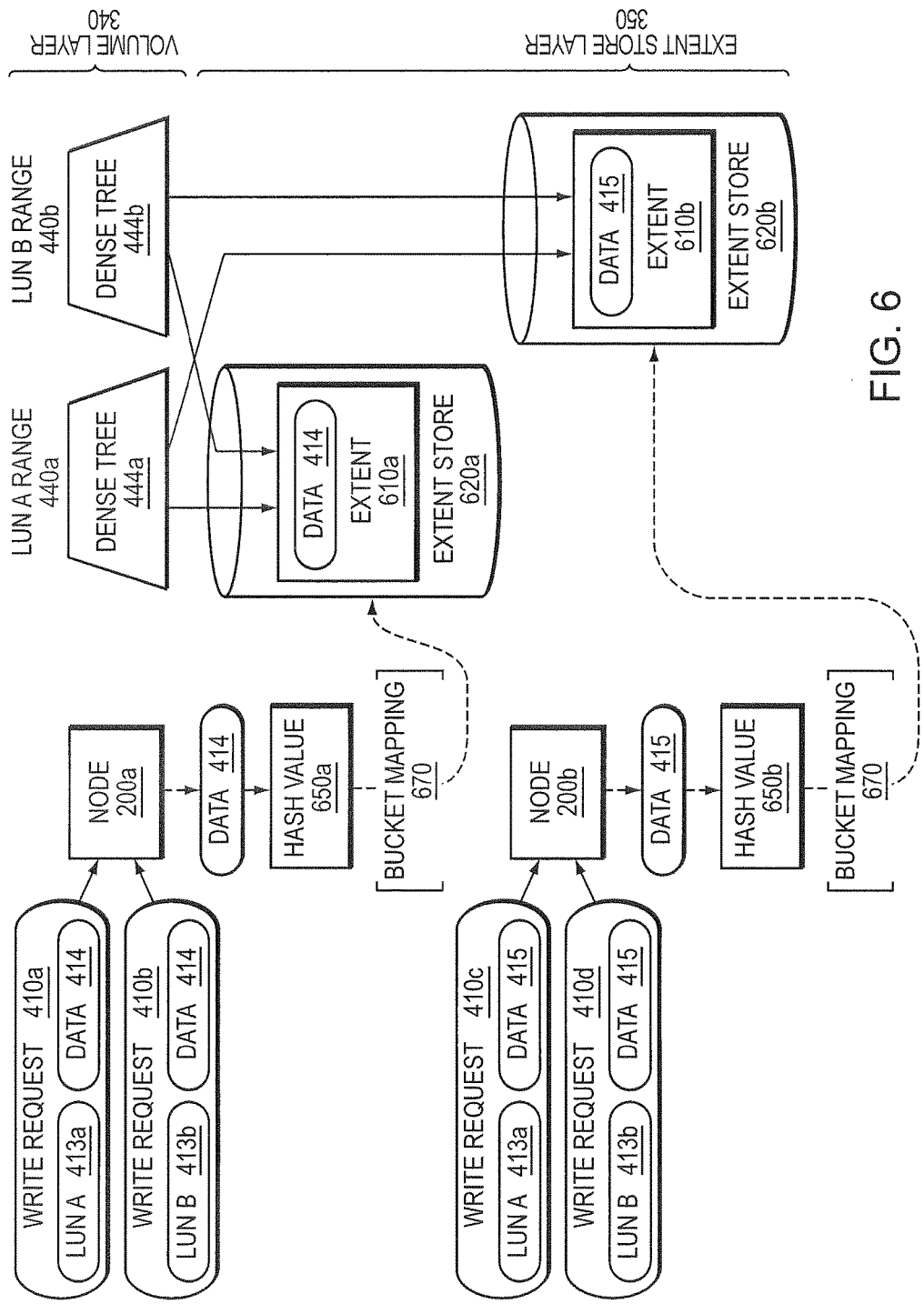
FIG. 6 illustrates a layered file system.

FIG. 6 illustrates a layered file system that may be advantageously used with one or more embodiments described herein. A plurality of write requests 410a,b, each directed to a different LUN having identical write data 414, may be received by a node 200a of the cluster 100. An identical hash value 650a computed from the write data of each write request 410a,b may lead to inline de-duplication (i.e., de-duplication before storage on SSD, as described previously) of that data within an extent store 620a (i.e., bucket). The dense trees 444a,b for each respective LUN (representing LUN offset ranges 440a,b respectively) may reference the same extent 610a (i.e., may store the same extent key 475, not shown). Similarly, another plurality of write requests 410c,d having different identical write data 415 received by a node 200b of the cluster may lead to de-duplication of that data in another extent store 620b. Thus, the bucket mapping 670 of the hash value 650 may lead to a different extent store 620b for data 415 than for data 414 (which may lead to extent store 620a). Similarly, the dense trees 444a,b for each respective LUN (representing LUN offset ranges 440a,b respectively) may reference the same extent 610b (i.e., may store the same extent key 475, not shown).

As noted, the persistence layer 330 may compute a hash value 650 on an extent 610 to determine which extent store instance 470 (or extent store) is associated with the extent in accordance with the bucket mapping technique 670. The persistence layer may then pass the hash value 650 to the appropriate volume layer instance, which then passes on the hash value to the appropriate extent store instance via an extent store put operation. The extent store instance may determine whether the extent is previously stored on SSD in accordance with a de-duplication opportunity. If the extent is not stored on the storage arrays of the cluster (i.e., anywhere in the cluster), the extent store instance may form a unique extent key 475 from the hash value 650 prior to storing the extent (as compressed) on SSD and return that unique key to the volume layer instance. However, if it is determined that the extent is stored on any of the storage arrays in the cluster, the extent store instance may return the extent key for that stored extent to the volume layer instance, thereby enabling global inline de-duplication (i.e., de-duplication before storage on SSD) that obviates the need for a duplicate copy of the extent. Thus, the inline global de-duplication opportunity arises from (and thus provides a motivation for) the separation of the file system functions among the layers. Notably, the volume layer is unaware of de-duplicated data stored only once in the underlying extent store layer. Facilitation of bucket mapping via a hash space and the resulting distribution of data and metadata among the extent store instances of the cluster also arise from the separation of the file system functions among the layers. That is, the volume layer is also unaware of which extent store instance stores an extent, as extent keys are global within the cluster. Thus, the benefit of inline global de-duplication of data and distribution of data (and metadata) within the cluster both result from a separation of the file system functions among the layers.

Advantageously, the separation of the volume and extent store layers permits a storage location of an extent on SSD to be effectively virtualized by its mapped extent key such that relocation of the extent on SSD does not require update to volume layer metadata (i.e., the extent key sufficiently identifies the extent). As noted, virtualization of the storage locations also permits cleaning processes to occur in the extent store layer without update to volume layer metadata, thereby substantially reducing write amplification.

In an embodiment, functions of the log-structured layer of the file system, such as write allocation and flash device (i.e., SSD) management, are performed and maintained by the extent store layer. Write allocation may include gathering of the variable-length extents to form full stripes that may be written to free segments across SSDs of one or more RAID groups. That is, the log-structured layer of the file system writes extents to initially free (i.e., clean) segments as full stripes rather than partial stripes. Flash device management may include segment cleaning to create such free segments that indirectly map to SSDs via the RAID groups. Accordingly, partial RAID stripe writes are avoided, which results in reduced RAID-related write amplification.

In addition, instead of relying on garbage collection in the SSDs, the storage I/O stack may implement segment cleaning (i.e., garbage collection) in the extent store layer to bypass performance impacts of flash translation layer (FTL) functionality (including garbage collection) in the SSD. In other words, the storage I/O stack allows the log-structured layer of the file system to operate as a data layout engine using segment cleaning to effectively replace a substantial portion of the FTL functionality of the SSD. The extent store layer may thus process random write requests in accordance with segment cleaning (i.e., garbage collection) to predict flash behavior within its FTL functionality. As a result, a log-structured equivalent source of write amplification for the storage I/O stack may be consolidated, and managed, at the extent store layer so that it subsumes (i.e., proxies) RAID-related and SSD related (i.e., FTL functionality) write amplification. That is, the log-structured nature of the extent store layer may be used to control and, thus, reduce both RAID-related write amplification and SSD-related write amplification. Further, the log-structured layer of the file system described herein may be employed, in part, to improve write performance from the flash devices of the storage array.

As noted, the log-structured layout of SSDs is realized by sequentially writing extents to clean segments. Thus, the log-structured layout (i.e., sequential storage) employed by the extent store layer inherently supports variable length extents, thereby allowing unrestricted compression of extents prior to storage on SSD and without specific block level (i.e., in SSD blocks) metadata support from the SSDs, such as 520 byte sectors supporting 512 bytes of data and 8 bytes of metadata (e.g., a pointer to another block containing a tail-end of compressed data.) Typically, consumer grade SSDs support sectors as powers of 2 (e.g., 512 bytes); whereas more expensive enterprise grade SSDs may support enhanced sized sectors (e.g., 520 bytes). Accordingly, the extent store layer may operate with lower cost consumer grade SSDs while supporting variable length extents with their concomitant unfettered compression.

Segment Cleaning

Figure 7A:
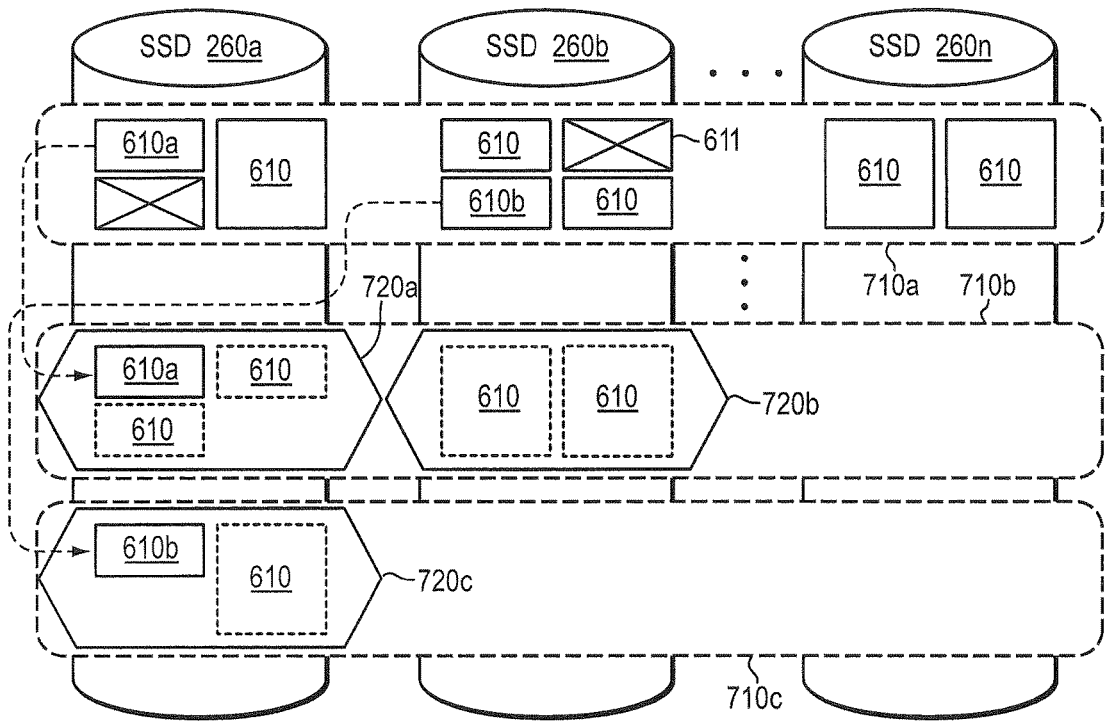
FIG. 7a illustrates segment cleaning by a log-structured layer of the file system.

FIG. 7a illustrates segment cleaning by the log-structured layer of the file system. In an embodiment, the extent store layer 350 of the layered file system may write extents to an empty or free region or "segment". Before rewriting that segment again, the extent store layer 350 may clean the segment in accordance with segment cleaning which, illustratively, may be embodied as a segment cleaning process. That is, the segment cleaning process may read all valid extents 610 from an old segment 710*a* and write those valid extents (i.e., extents not deleted or overwritten 611) to one or more new segments 710*b,c*, to thereby free-up (i.e., "clean") the old segment 710*a*. New extents may then be written sequentially to the old (now clean) segment. The log-structured layer may maintain a certain amount of reserve space (i.e., free segments) to enable efficient performance of segment cleaning. For example, the log-structured layer (i.e., extent store layer) may illustratively maintain a reserve space of free segments equivalent to approximately 7% of storage capacity. The sequential writing of new extents may manifest as full stripe writes 458, such that a single stripe write operation to storage spans all SSDs in a RAID group 466. That is, write data may be accumulated until a stripe write operation of a minimum depth (e.g., 64 KB) can be made.

Illustratively, segment cleaning may be performed to free one or more selected segments that indirectly map to SSDs. As used herein, a SSD may be composed of a plurality of segment chunks 720, wherein each chunk is illustratively approximately 1 GB in size. A segment may include one segment chunk 720*a-c* from each of a plurality of SSDs in a RAID group 466. Thus, for a RAID group having 24 SSDs, wherein the equivalent storage space of 22 SSDs store data (data SSDs) and the equivalent storage space of 2 SSDs store parity (parity SSDs), each segment may include 22 GB of data and 2 GB of parity. The RAID layer may further configure the RAID groups according to one or more RAID implementations, e.g., RAID 1, 4, 5 and/or 6, to thereby provide protection over the SSDs in the event of, e.g., failure to one or more SSDs. Notably, each segment may be associated with a different RAID group and, thus, may have a different RAID configuration, i.e., each RAID group may be configured according to a different RAID implementation. To free-up or clean selected segments, extents of the segments that contain valid data are moved to different clean segments and the selected segments (now clean) are freed for subsequent reuse. Segment cleaning consolidates fragmented free space to improve write efficiency, e.g., to stripes by reducing RAID-related write amplification and to underlying flash blocks by reducing performance impacts of the FTL. Once a segment is cleaned and designated freed, data may be written sequentially to that segment. Accounting structures, e.g., free segment maps or an amount of segment free space, maintained by the extent store layer for write allocation, may be employed by the segment cleaning process. Notably, selection of a clean segment to receive data (i.e., writes) from a segment being cleaned may be based upon the amount of free space remaining in the clean segment and/or the last time the clean segment was used. Note further that different portions of data from the segment being cleaned may be moved to different "target" segments. That is, a plurality of relatively clean segments 710*b,c* may receive differing portions of data from the segment 710*a* being cleaned.

In an embodiment, segment cleaning may cause some write amplification in the storage array (SSDs). However, the file system may reduce such write amplification by writing extents to the SSDs sequentially as a log device. For example, given SSDs with an erase block size of approximately 2 MBs, by writing at least 2 MB of data (extents) sequentially to a free segment, an entire erase block may be overwritten and fragmentation at the SSD level may be eliminated (i.e., reducing garbage collection in the SSD). However, the SSDs typically stripe data across multiple flash components and across multiple channels in order to realize performance. Thus, a relatively large (e.g., 1 GB) write granularity to a free (i.e., clean) segment may be necessary to avoid write amplification at the SSD level (i.e., to override internal SSD striping).

Specifically because the erase block boundaries in the SSD may be unknown, the write granularity should be large enough so that a sequence of writes for extents over a large contiguous range may overwrite previously written extents on the SSD and effectively override garbage collection in the SSDs. In other words, such garbage collection may be preempted because the new data is written over the same range as previous data such that the new data completely overwrites the previously written data. This approach also reduces consumption of the reserve space capacity with the new write data. Accordingly, an advantage of the log-structured feature of the storage I/O stack (i.e., log-structured layer in the file system) is the ability to reduce write amplification of the SSDs with only a minimum amount of reserve space in the SSDs. This log-structured feature effectively "moves" flash device management of reserve space from the SSD to the extent store layer, which uses that reserve space to manage the write amplification. Thus, instead of having two sources of write amplification (i.e., RAID-related operations and the SSD FTL, which multiply) there is only one source of write amplification (i.e., the extent store layer). That is, the log-structured nature of the extent store layer may be used to control and, thus, reduce both RAID-related write amplification and SSD-related write amplification.

Segment Policies

As noted above, a plurality of segments may be involved during segment cleaning. In an embodiment, the log-structured layer of the file system may employ data structures to maintain information for heuristics and policies directed to, e.g., classification of segments based on data as well as metadata describing the layout of the data on SSDs of the storage array. Assume, for example, that the layered file system services a random write operation workload and, after extent hashing, initially stores the associated write data as one or more "hot" extents on the SSDs, which extents subsequently become "cold." Illustratively, the classification of an extent as "cold" or "hot" may be determined by a policy that models (i.e., predicts) the expected longevity (i.e., before deletion) of the extent based on factors, such as when the extent was last accessed or a type (e.g., video, text) of data in the extent. Such a policy may further facilitate separation of hot and cold extents based on, e.g., ages of the extents. For example, if an extent has survived N segment cleanings and, therefore, has been copied N times by the segment cleaning process, a decision may be rendered that the extent may continue to be retained for a long period of time and thus is "cold." Accordingly, the extent may be stored in a cold segment rather than a hot segment. The algorithm used to determine the age at which an extent may be declared "hot" or "cold" may vary based on the distribution of ages of the extents within an extent store instance.

As a result, hot segments (i.e., hot extents moved into them) may require more frequent cleaning than cold segments (i.e., cold extents moved into them), which change less frequently. The classification of a segment (and its extents) can be further extended to various gradients of hot and cold, e.g., "very hot," "hot," "cold," "very cold". Such classifications may represent discrete points along a continuous spectrum of expected extent longevity.

As used herein, a log-structured layout capability may denote writing of the data (or metadata) in a pattern that is efficient for sequentially-accessed devices. More specifically, a log-structured technique may convert write data associated with write operations from the host that have "temporal locality" (i.e., are performed close together in time) to a layout that has "spatial locality" on the SSD, even though the data may not be spatially local in the address space as viewed by the host. That is, the host may consider the data to be random (i.e., written at random times), but because the data is either received close in time (e.g., a "burst" of writes) at a node or is de-staged close in time by the node using, e.g., the write-back cache, the data is written to the persistent storage proximately (i.e., with spatial locality) on the device (i.e., SSD) in order to get better write performance out of the device. By employing log-structured capability, the file system may flush (write) data associated with unrelated (random) write operations to SSD in a pattern that is efficient for extracting write performance from the SSD (i.e., the log-structured capability transposes the random write operations from the host to sequential write operations at the node for efficient storage on the SSD). In the case of flash storage devices, it may be advantageous that the data be written in a specific sequence or order (e.g., large contiguous range) as a group to a segment (i.e., a segment write cycle) to reduce, e.g., performance impact of FTL in the SSD.

Figure 7B:
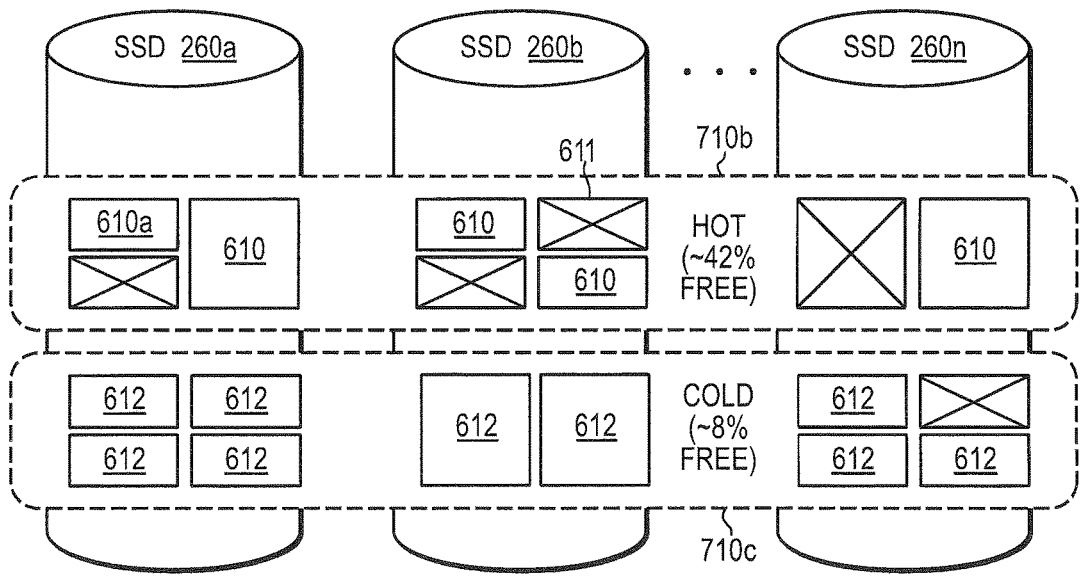
FIG. 7b illustrates hot and cold segments used by the log-structured layer of the file system.

FIG. 7b illustrates hot and cold segments used by the log-structured layer (i.e., extent store layer) of the file system. In an embodiment, the log-structured layout applied to SSD storage has various attributes. For example, data and metadata (extents) are written to clean segments and full RAID stripes are written to minimize parity overhead. Eventually, hot extents 610 and cold extents 612 may be split from each other into distinct segments (i.e., hot segments 710b and cold segments 710c) over a number of segment cleaning cycles. Because writing and deleting of the extents are based on host data access patterns, they may be non-uniform which may be exploited by splitting the extents between hot and cold. For example, a large amount of data (or metadata) may be written and then left for a relatively long time without being deleted or overwritten. An overwrite that occurs at the extent store layer illustratively manifests as an extent 611 being deleted and replaced by another extent, because their extent keys are different. From the point of view of the extent store layer, the non-uniform write pattern manifests as different extents being valid (i.e., not overwritten or deleted) for different lengths of time, and the longer an extent is valid, the longer it is likely to stay valid. Conversely, the more recently an extent was written, the more likely it is to be deleted before it significantly ages. That is, more recent data is more likely to be modified (i.e., overwritten or deleted), whereas older data is less likely to be even accessed.

Thus, segregating the extents into hot and cold segments facilitates creation of entire segments of extents that are densely packed with currently valid data as the segments are cleaned. Because valid extents are deleted at a much lower rate than extents in other segments, valid data segments (i.e., having few extents overwritten or deleted) have a lower fraction of free space relative to the other segments. Accordingly, unnecessary write amplification is reduced as segments with greater data change (i.e., hot segments with extents frequently being overwritten or deleted) may maintain a greater amount of free space than segments with less data change (i.e., cold segments with infrequently accessed data). That is, segments may be selected for cleaning based on the amount of their free space. Hot and cold segments may be treated differently because a lower fraction of free space may be maintained in the cold segments to realize a higher fraction of free space, on average, in the hot segments. By keeping some of the segments full of cold data and with low free space, the overall free space may be less fragmented and concentrated into the hot segments.

As their extents are deleted, the hot segments may end up with a higher average free space than the overall free space average. Unnecessary copying of valid data may be reduced during segment cleaning because segments are organized into hot and cold segments, which yields greater efficiency of (i.e., reduces) write amplification. That is, the amount of data that has to be rewritten elsewhere (i.e., to a clean segment) when cleaning a segment may be lower because more of that segment was already freed by the time it is cleaned. Conversely, consider a simple case with uniform random writes in which all of the segments are treated equally as hot or cold, and the segment with the highest free space at any given time is chosen for cleaning. For this case, if the full amount of reserved space on the SSD is, e.g., 20%, then the segments most recently cleaned are 0% free and, due to a snowplow effect (i.e., accumulating of data changes over time), the segments that are oldest and about to be cleaned are at (roughly) a 40% free level.

In an embodiment, the cold segments may be cleaned at a lower level of free space than hot segments. In effect, the cold segments are cleaned less frequently so that they collectively have less overall free space (i.e., contain more data) leaving a greater amount of overall free space for the hot segments. Illustratively, for each hot and cold segment, the segment with most free space may be chosen for cleaning in order to get the best efficiency, i.e., the lowest amount of write amplification. The segment with the most amount of free space may be chosen for cleaning because it has the least amount of valid data that has to be relocated, thus yielding the lowest amount of unnecessary write amplification. Accordingly, to continually keep their free space low, cold segments may be chosen for cleaning even though they have, e.g., only 8% free space. Notably, a low free space threshold may be maintained as long as the rate of cleaning cold segments is relatively low compared to the rate of cleaning hot segments, i.e., the percentage of free space in the hot segments is relatively high as compared to the cold segments.

Write Allocation

In an embodiment, there may be multiple RAID stripes per segment. Each time a segment is allocated, i.e., after cleaning the segment, the chunks of various SSDs within the segment may include a series of RAID stripes each aligned by extent. That is, the extents 610 may be formed into chunks 720 and written to SSD as RAID stripes that remain aligned (i.e., logically) by extent within each chunk of a segment. Note that the chunks may be at the same or different offsets within the SSDs. The extent store layer may read the chunks sequentially for cleaning purposes and relocate all the valid data to another segment. Thereafter, the chunks 720 of the cleaned segment may be freed and a decision may be rendered as to how to constitute the next segment that uses the chunks. For example, if a SSD is removed from a RAID group, a portion (i.e., a set of chunks 720) of capacity may be omitted from the next segment (i.e., change in RAID stripe configuration) so as to constitute the RAID group from a plurality of chunks 720 that is one chunk narrower, i.e., makes the RAID width one less. Thus, by using segment cleaning, a RAID group of the chunks 720 constituting the segments may be effectively created each time a new segment is allocated, i.e., a RAID group is created dynamically from available SSDs when a new segment is allocated. There is generally no requirement to include all of the SSDs 260 in the storage array 150 in the new segment. Alternatively, a chunk 720 from a newly introduced SSD can be added into a RAID group created when a new segment 710 is allocated.

Figure 8:
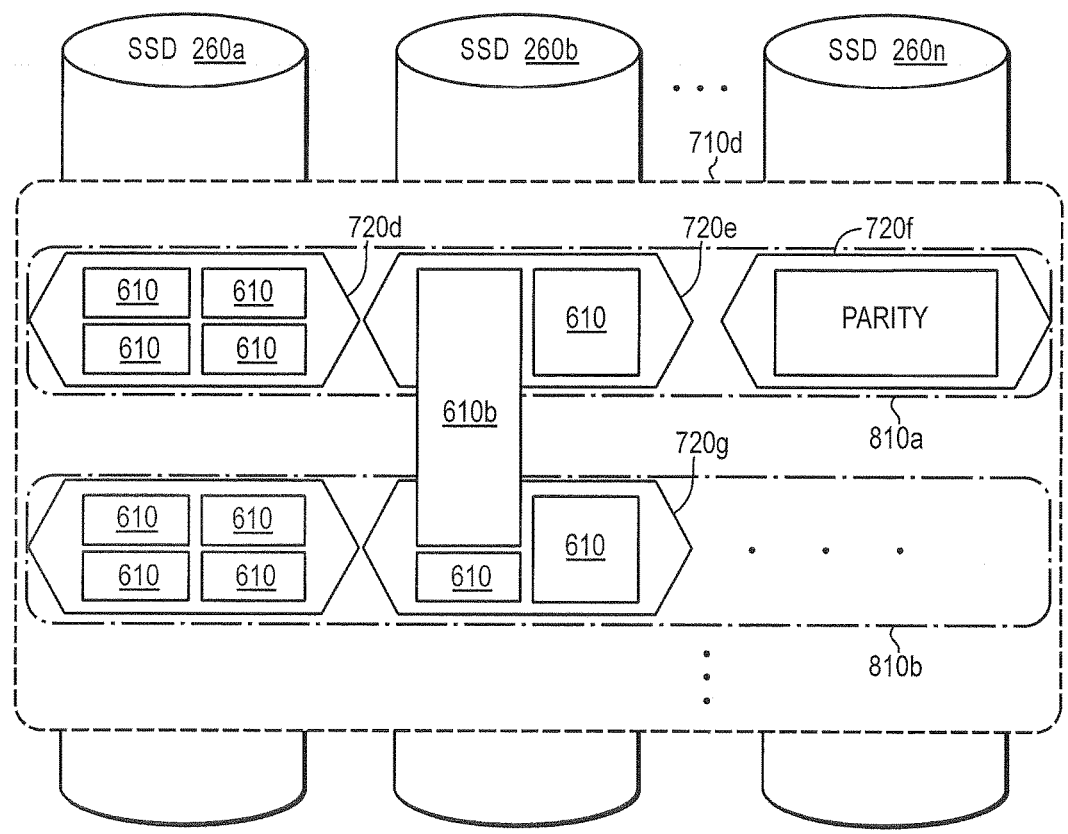
FIG. 8 illustrates a RAID stripe formed by the log-structured layer of the file system.

FIG. 8 illustrates a RAID stripe formed by the log-structured layer of the file system. As noted, write allocation may include gathering of the variable-length extents to form one or more stripes across SSDs of one or more RAID groups. In an embodiment, the RAID layer 360 may manage parity computations and topology information used for placement of the extents 610 on the SSDs 260a-n of the RAID group 466. To that end, the RAID layer may cooperate with the extent store layer to organize the extents as stripes 810 within the RAID group. Illustratively, the extent store layer may gather the extents 610 to form one or more full stripes 810 that may be written to a free segment 710d such that a single stripe write operation 458 may span all SSDs in that RAID group. The extent store layer may also cooperate with the RAID layer to pack each stripe 810 as a full stripe of variable-length extents 610. Once the stripe is complete, the RAID layer may pass the full stripe 810 of extents to the storage layer 365 of the storage I/O stack for storage on the SSDs 260. By writing a full stripe (i.e., data and parity) to the free segment, the extent store layer (i.e., log-structured layer of the file system) avoids the cost of parity updates and spreads any required read operation load across the SSDs. Notably, the extents 610 pending a write operation on an SSD 260 may be accumulated into a chunk 720d,e, which is written as one or more temporally proximate write operations to the SSD (e.g., as 1 Gbyte), thereby reducing the performance impact of the FTL in the SSD.

In an embodiment, an extent store may be viewed as a global pool of extents stored on the storage arrays 150 of the cluster, where each extent may be maintained within a RAID group 466 of an extent store instance. Assume one or more variable-length (i.e., small and/or large) extents are written to a segment 710d. The extent store layer may gather the variable-length extents to form one or more stripes across the SSDs is of the RAID group. Although each stripe may include multiple extents 610 and an extent 610b could span more than one stripe 810a,b, each extent is entirely stored on one SSD. In an embodiment, a stripe may have a depth of 16 KB and an extent may have a size of 4 KB, but the extent may thereafter be compressed down to 1 or 2 KB or smaller permitting a larger extent to be packed which may exceed the stripe depth (i.e., the chunk 720 depth). Thus, a stripe may constitute only part of the extent, so the depth of the stripe 810 (i.e., the set of chunks 720d-f constituting the stripe) may be independent of the extent(s) written to any one SSD. Since the extent store layer may write the extents as full stripes across one or more free segments of the SSDs, write amplification associated with processing information of the stripes may be reduced.

Operationally, the extent store layer may send the extents to the RAID layer, which attempts to pack the stripes as much as possible with the compressed, variable length extents. In an embodiment, a minimum unit of write operation in the storage I/O stack may constitute a stripe depth of 4 KB, or 8 sectors of 512 or 520 bytes depending on the underlying sector size of the SSD. Once a full stripe is complete, the RAID layer may pass the extents to the storage layer, which may cooperate with the persistence layer to store the full stripe of extents on the SSDs. Notably, the size of write operations may vary depending on the write load on the system. Illustratively write operations may vary from a minimum of about 4 KB chunks per SSD under a light write load, to a maximum of 64 KB chunks per SSD under a heavy write load, which may be determined by pressure in the persistent write-back cache 380. As such, the persistence layer may wait until enough write data is accumulated in the write-back cache (i.e., a larger write size) before writing data (i.e., larger chunk sizes) to SSD. Alternatively, a smaller write size may be chosen to ensure timely and safe storage of the data on SSD (i.e., smaller chunks written more frequently to SSD). Accordingly, the log-structured layer of the file system may control write operations (i.e., chunks to SSD) both in frequency and size to sustain an effective streaming bandwidth to the SSDs of the storage array, thereby efficiently using the SSDs while overriding their garbage collection. As noted, a sufficient amount of write data over a contiguous range within a time frame (i.e., temporal locality) may be required to effectively override garbage collection in the SSDs.

Advantageously, the layered file system described herein provides sequential log-structured layout of data and metadata as extents (i.e., log-structured layout) on SSDs, embodied as flash storage devices, to reduce write amplification, while leveraging variable compression and variable length extent features, as well as an extent de-duplication feature, of the storage I/O stack. The data may be organized as an arbitrary number of variable-length extents of one or more LUNs served by the nodes, whereas the metadata may be organized as volume and extent metadata. The volume and extent metadata may be separated and organized as compact file system metadata structures residing in memories of the nodes to enable high performance processing of the extents with respect to, e.g., de-duplication and/or compression. In addition, the volume and extent store layer file systems may cooperate to store the extents on SSD in a log-structured manner that is flash friendly with respect to random write operations and that reduces RAID-related write amplification.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method comprising:
organizing a storage array of solid state drives (SSDs) coupled to a node as a redundant array of independent disks (RAID) group;

organizing data and metadata on the SSDs in a sequential log-structured layout, the data stored as extents of a logical unit (LUN) served by the node;

gathering the extents to form a stripe written as a write operation that spans all of the SSDs in the RAID group; and controlling a frequency and a size of the write operation to sustain a streaming bandwidth to the SSDs and to override garbage collection in the SSDs.

2. The method of claim 1 wherein controlling the frequency and the size of the write operation further comprises varying the size of the write operation depending on a write load served by the node.

3. The method of claim 2 wherein the size of the write operation varies from a minimum size to a maximum size depending on the write load, wherein the maximum size is at least 10 times the minimum size.

4. The method of claim 2 wherein varying the size of the write operation comprises determining the size of the write operation based on pressure in a write-back cache of the node.

5. The method of claim 2 wherein controlling the frequency and the size of the write operation further comprises waiting until enough data is accumulated in a write-back cache of the node to form a sufficiently large write size to override garbage collection in the SSDs.

6. The method of claim 2 wherein controlling the frequency and the size of the write operation further comprises choosing a sufficiently small write size to ensure timely storage of the data on the SSDs.

7. The method of claim 1 wherein controlling the frequency and the size of the write operation comprises writing the extents of the write operation over a same SSD address range as previously written extents on the SSD to override the garbage collection in the SSDs.

8. A system comprising:
a processor connected to a memory;
a storage array connected to the processor and having solid state drives (SSDs);
a storage input/output (I/O) stack executing on the processor to:
organize the SSDs as a redundant array of independent disks (RAID) group;
organize data and metadata on the SSDs in a sequential log-structured layout, the data stored as extents of a logical unit (LUN) served by the storage I/O stack;
gather the extents to form a stripe written as a write operation that spans all of the SSDs in the RAID group; and
control a frequency and a size of the write operation to sustain a streaming bandwidth to the SSDs and to override garbage collection in the SSDs.

9. The system of claim 8 wherein the size of the write operation varies depending on a write load served by the storage I/O stack.

10. The system of claim 9 wherein the size of the write operation varies from a minimum size to a maximum size depending on the write load, wherein the maximum size is at least 10 times the minimum size.

11. The system of claim 9 wherein the size of the write operation is determined based-on pressure in a write-back cache connected to the processor.

12. The system of claim 9 further comprising a write-back cache connected to the processor, the write-back cache configured to accumulate enough data to form a sufficiently large write size to override garbage collection in the SSDs.

13. The system of claim 8 wherein the extents of the write operation are written over a same SSD address range as previously written extents on the SSD to override the garbage collection in the SSDs.

14. A non-transitory computer readable medium including program instructions for execution on a processor, the program instructions configured to:
organize a storage array of solid state drives (SSDs) coupled to a node a redundant array of independent disks (RAID) group;
organize data and metadata on the SSDs in a sequential log-structured layout, the data stored as extents of a logical unit (LUN) served by the node;
gather the extents to form a stripe written as a write operation that spans all of the SSDs in the RAID group; and
control a frequency and a size of the write operation to sustain a streaming bandwidth to the SSDs and to override garbage collection in the SSDs.

15. The non-transitory computer readable medium of claim 14 wherein program instructions are further configured to:
vary the size of the write operation depending on a write load served by the node.

16. The non-transitory computer readable medium of claim 15 wherein the size of the write operation varies from a minimum size to a maximum size depending on the write load, wherein the maximum size is at least 10 times the minimum size.

17. The non-transitory computer readable medium of claim 15 wherein program instructions are further configured to:
determine the size of the write operation based-on pressure in a write-back cache of the node.

18. The non-transitory computer readable medium of claim 15 wherein program instructions are further configured to:
wait until enough data is accumulated in a write-back cache of the node to form a sufficiently large write size to override garbage collection in the SSDs.

19. The non-transitory computer readable medium of claim 15 wherein program instructions are further configured to:
choose a sufficiently small write size to ensure timely storage of the data on the SSDs.

20. The non-transitory computer readable medium of claim 14 wherein program instructions when executed are further configured to:
write the extents of the write operation over a same SSD address range as previously written extents on the SSD to override the garbage collection in the SSDs.

* * * * *